INVENTOR.
WILLIAM L. GREENE
BY
Scrivener & Parker

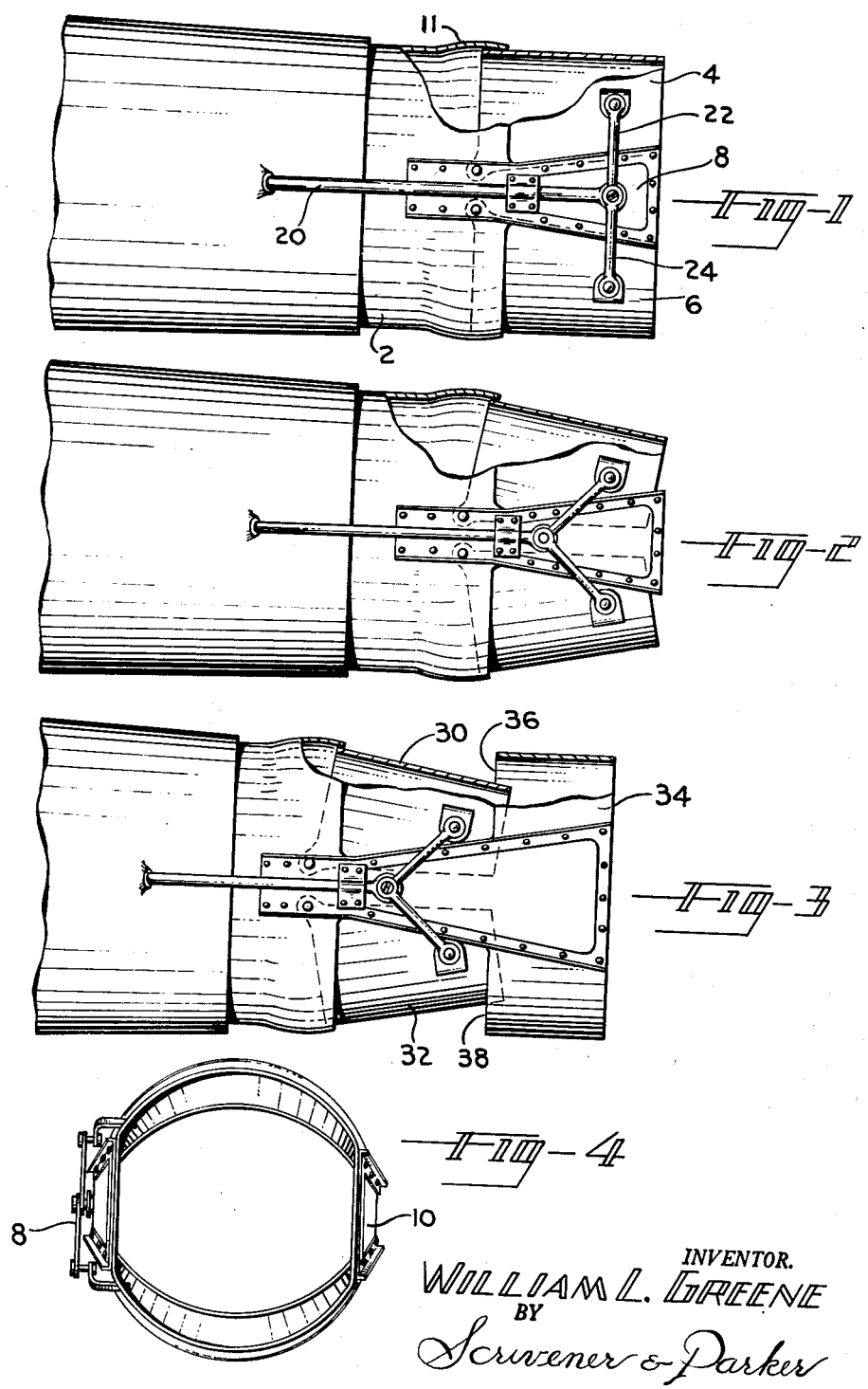

Patented June 15, 1954

2,680,948

UNITED STATES PATENT OFFICE 2,680,948

VARIABLE AREA TAIL PIPE FOR JET ENGINES

William L. Greene, Takoma Park, Md., assignor to Engineering & Research Corporation, Riverdale, Md., a corporation of Maryland Application August 30, 1948, Serial No. 46,856

1 Claim. (Cl. 60—35.6)

This invention relates broadly to the propulsion of aircraft by means of the reaction of rearwardly-discharged gases, such as is accomplished by jet engines and rockets and, more particularly, has to do with the nozzle or tail-pipe through and from which the gases are discharged. Although not limited to use with turbo-jet engines the invention will be described in this application in connection with such an engine.

In jet engine design and operation it has been established that the jet orifice should vary in size with various operating conditions in order to achieve maximum efficiency and performance under such varied conditions. For example, in one type of jet engine to which this invention may be usefully applied air is taken into the inlet end of the engine duct, compressed, passed into combustion chambers, thence to a turbine which drives the compressor and, from there, passes through the tail-pipe to be discharged rearwardly of the aircraft to produce the forward propulsive effort. In some engines now being used additional propulsive effort for take-off, climbing and high-speed maneuvering is secured by burning additional fuel on the delivery side of the turbine to raise the temperature of the advancing gas. It has been found that when such a so-called "after-burner" is used, efficiency considerations require that the area of the passage through the tail-pipe be greater than its area under normal cruising conditions when the after-burner is not in use. It has therefore become desirable that means be provided for varying the area of the tail-pipe passage and a number of constructions and arrangements have been proposed for accomplishing this end.

In addition to efficiency considerations, a variable area tail-pipe also provides means for accomplishing another result of great benefit to jet engine operation. This result is due to the fact that at high altitudes a considerable temperature drop occurs which may be as great as 150° below sea level temperature. This causes the entire cycle of the jet engine to operate at a lower temperature than that at which the engine was designed to operate at maximum efficiency. By known means the area of the tail-pipe nozzle may be progressively reduced as the ambient temperature decreases, thus creating a progressively increasing back pressure in the engine which tends to increase the temperature of operation of the engine and consequently maintain it at the temperature at which it operates with maximum efficiency.

It will be apparent that the reduction of the area of the tail-pipe is never continued to complete shut-off if the reduction is being accomplished only for the reasons set forth above. However, complete shut-off and reversal of direction of the discharged gases are of great utility under certain operating conditions. For example, it is well known that if a jet engine is throttled down to reduce the jet thrust and is then run up to high speed, some time will elapse before the jet produces full thrust. This is a source of danger in such operations as landing, in which it may be necessary to go very quickly from the low thrust requirement of the usual landing operation to the very high thrust requirement of recovery from a bad landing and quick gain of altitude.

These new and advantageous results are accomplished by my present invention by the provision of vanes which normally form part of the tail-pipe but which may be moved simultaneously toward each other, thus restricting the area of the tail-pipe opening. These vanes are disposed forwardly of the rear end of the tail-pipe whereby an opening is produced between the vanes and the rear end part of the tail-pipe upon closure of the vanes, through which air is drawn into the tail-pipe rearwardly of the vanes. This added air increases the total volume of air discharged from the tail-pipe, thus increasing the velocity of the discharged gases and consequently adding to their reactive propulsive effect. In those forms of the invention in which it is a thrust-spoiler the closure of the vanes may be continued to full shut-off and the forward ends of the vanes are caused to move outside of the tail-pipe, thus causing the gases which impinge on the vanes to be reversed in direction by the vanes and discharged in the direction of movement of the aircraft. As the vanes may be quickly moved between closed and open positions they may be closed for maneuvers requiring low thrust, such as landings, and quickly opened to give partial or maximum thrust if this is required, all without throttling down the engine.

A number of embodiments of my invention are described in the following specification and illustrated in the annexed drawings, it being understood that these are only illustrative of the invention and impose no limits thereon not imposed by the appended claim.

In the drawings forming part of this application,

Fig. 1 is a side elevational view of the tail-pipe of a jet propelled aircraft, showing nozzle-restricting means with the vanes in open position;

Fig. 2 shows the tail-pipe of Fig. 1 with the vanes in nozzle-restricting position;

Fig. 3 is similar to Fig. 1 but shows one form of the invention;

Fig. 4 is an end view of the tail-pipe of Fig. 3, showing the vanes in nozzle-restricting positions;

Figure 5:
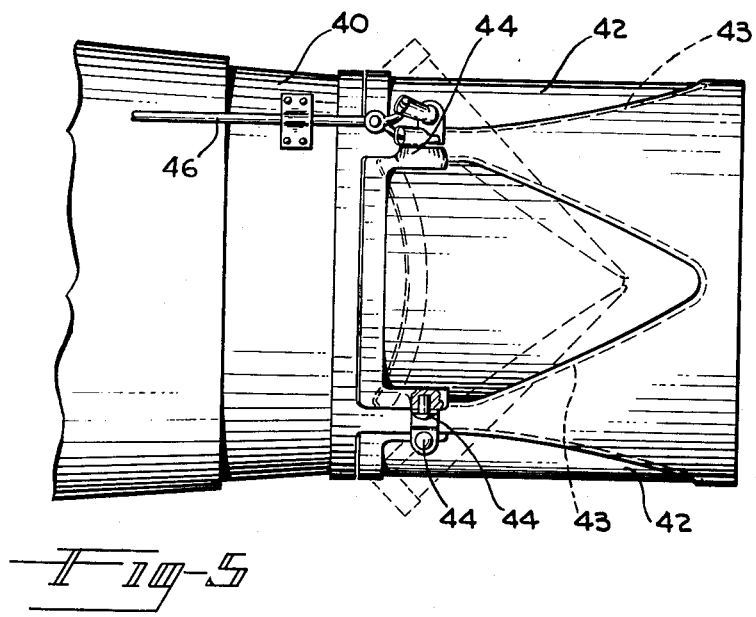
Fig. 5 is a side view of the tail-pipe of a jet engine having incorporated therewith thrust spoilers according to a second form of my invention.

It is now known to modify the extreme rear part of the tail-pipe of a jet engine by forming a plurality of circumferentially spaced openings therein and covering or filling each opening with a pivoted vane which is movable from a position in which it forms part of the wall and offers no obstruction to the free flow of gases through the pipe, to a position in which it is positioned inwardly of the pipe in order to restrict the size of the tail-pipe passage to any desired degree. In one form which such known devices may take, which is disclosed in Figs. 1 and 2, the rear end of the tail-pipe has two circumferentially spaced openings therein filled by vanes 4, 6, which normally form part of the tail-pipe. Each vane is slightly less than semi-circular in extent and, accordingly, diametrically-spaced parts 8, 10 are provided between their adjacent edges, which parts are integral with the tail-pipe and extend rearwardly therefrom. The vanes are pivotally mounted at their forward edges on these rearwardly-extending parts of the tail-pipe and are movable on these pivots from an open position in which they form part of the tail-pipe to a closed position in which they are inclined inwardly and rearwardly toward each other thereby forming a rearwardly-extending frusto-conical surface the smaller and rearward end of which is smaller than the normal area of the tail-pipe by an amount which is a function of the degree to which the vanes are moved toward each other. The parts 8, 10 are preferably flattened and therefore do not conform to the normal circular cross-section of the tail-pipe, this being done in order to permit perfect freedom of movement of the vane-operating means which are described hereinafter and also to provide diametrically opposed flat walls against which the edges of the vanes move between their open and closed positions. It will be seen that if these parts 8, 10 were not flattened, openings would be left between the edges of the vanes and the tail-pipe when the vanes are in closed position. In those forms of the invention in which the vanes are not thrust-spoilers the forward ends of the vanes are disposed interiorly of the tail-pipe, form a very close fit therewith, thus insuring that no gases will escape between the forward edges of the vanes and the wall of the tail-pipe. In order to accommodate the forward edges of the vanes as they move on their pivotal supports the adjacent edge of the tail-pipe is outwardly arcuately curved as shown at 11.

The operating means for the vanes comprise an operating rod 20 which extends longitudinally of the tail-pipe and is connected at its rear end to the two vanes through articulated links 22 to 24 which form a toggle. When the operating rod 20 is moved rearwardly the toggle links will be spread, causing the vanes to move to open position in which they form part of the tail-pipe. When the rod is moved forwardly the toggle links will move toward each other, moving the vanes about their pivots and causing their rear ends to move toward each other into the tail-pipe in order to restrict the area thereof. The parts are shown in their open and closed positions in Figs. 1 and 2, respectively.

The embodiment of the invention shown in Figs. 3 and 4 comprises a tailpipe having a rear part 34 which provides a gas discharge orifice for the tailpipe which is of constant size. Spaced forwardly of the rear end of said tailpipe are a plurality of circumferential openings, in each of which is disposed a vane such as the vanes 30 and 32 shown. The vanes are of arcuate cross section and normally close the openings to provide part of the tailpipe. The vanes may be pivotally mounted as described for Figs. 1 and 2 and are movable from a normal position forming part of the tailpipe to a position in which the rear parts of the vanes are within the tailpipe to reduce the area of the tailpipe forwardly of the gas discharge orifice. The vanes then, in this position, form with the openings aforesaid passages 36 and 38 which direct or scoop ambient air into the tailpipe as the jet propelled aircraft moves forwardly. The large volume of air thus injected into the stream of the discharged gases increases the velocity thereof thereby adding to their reactive propulsive effect.

Two openings and vanes are shown in Figs. 3 and 4 and the rear part of the tailpipe thus partakes of an integrally attached ring such as the rear part 34. It should be understood that there may be any convenient number of openings in the side of a unitary tailpipe structure, the arrangement being similar with respect to the openings in the tail pipe as that shown in Fig. 6, though the vanes, of course, would be of the general type shown in Fig. 3 where there is no opening at their forward end when in an area reducing position.

In Fig. 5 of the drawings there is disclosed an embodiment of the invention illustrating the use of the same as a thrust spoiler. In this embodiment the tail-pipe 40 has four openings 43 therein which are normally closed by vanes 42 which, in such normal position, form part of the tail-pipe. The forward end of each vane is so positioned with respect to the wall of the tail-pipe, and the pivotal support 44 of each vane is so positioned, that when the vane is moved about its pivotal support to bring the rearward end into the tail-pipe the forward end moves outwardly of the tail-pipe. Thus, when the rearward ends of the four vanes 42 are brought together, as shown in dotted lines in Fig. 5, rearward movement of the gases is materially restricted or shut off and the gases are discharged forwardly through the four openings between the forward ends of the vanes and the wall of the tail-pipe. The combination of the shut-off of rearward discharge of the gases with the forward discharge thereof very effectively spoils the thrust of the jet and reduces or eliminates its forward propulsive effect. Suitable means 46 are provided for operating the vanes.

Figure 6:
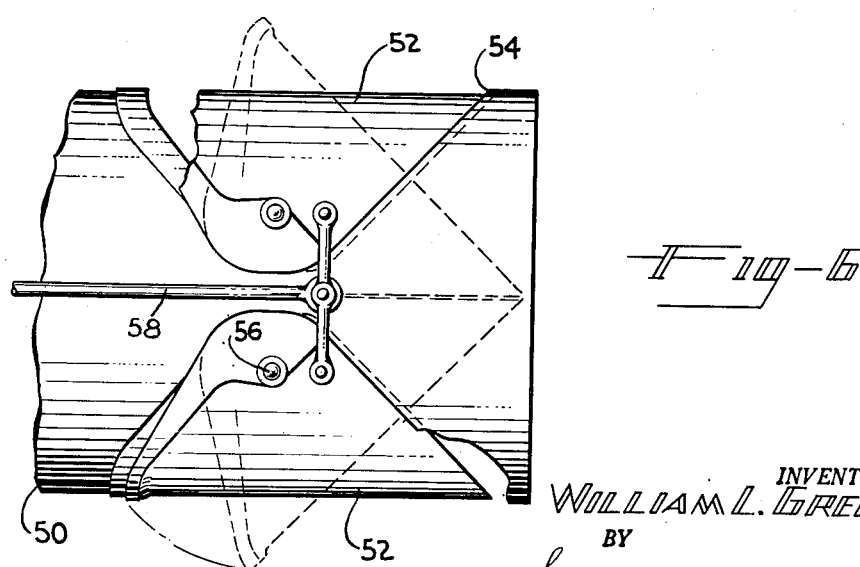
Fig. 6 is similar to Fig. 5 but shows a modified form of thrust spoilers.

The modified form of thrust spoiler disclosed in Fig. 6 differs from that of Fig. 5 only by having two vanes instead of four, all other features of structure and operation being the same. In this figure there are disclosed the tail-pipe 50, vanes 52 which close openings 54 in the tail-pipe and are pivoted at 56, and vane-operating means 58.

It is believed that the foregoing description will constitute a full disclosure of the invention to those skilled in the art. It is recognized that other embodiment of the invention, as well as modifications of those disclosed, may be made without departing in any way from the spirit or scope of the invention, for the limits of which reference must be made to the appended claim.

What is claimed is:

A tailpipe assembly for a jet propulsion unit comprising a generally cylindrical tailpipe having a gas discharge orifice of constant size at the rear thereof and having a plurality of circumferentially arranged openings spaced forwardly of the rear of said pipe, a vane of arcuate cross section disposed in each opening and normally closing the same and being shaped to provide part of tailpipe, each of said vanes being pivotally mounted for movement from its normal position forming part of the tailpipe to a position in which the rear part thereof is within the tailpipe to reduce the area of the tailpipe forwardly of the gas discharge orifice, the rear part of the vanes forming, with the openings in the tailpipe, passages through which ambient air is directed into the tailpipe by forward motion of the propulsion unit and discharged through said constant sized orifice with the propulsion gases of the jet propulsion unit, and means for simultaneously moving the vanes.

References Cited in the file of this patent

UNITED STATES PATENTS

| Number | Name | Date |
|---|---|---|
| 2,487,588 | Price | Nov. 8, 1949 |
| 2,510,506 | Lindhagen et al. | June 6, 1950 |
| 2,593,420 | Diehl | Apr. 22, 1952 |

FOREIGN PATENTS

| Number | Country | Date |
|---|---|---|
| 171,600 | Great Britain | Nov. 24, 1921 |
| 586,571 | Great Britain | Mar. 24, 1947 |
| 588,501 | Great Britain | May 27, 1947 |